United States Patent [19]

Front

[11] 4,313,635
[45] Feb. 2, 1982

[54] WIND DEFLECTOR SYSTEM FOR AERODYNAMIC DRAG REDUCTION

[76] Inventor: Charles M. Front, Matchpoint, Westower Dr., Apt. 5840 D, Richmond, Va. 23225

[21] Appl. No.: 138,626

[22] Filed: Apr. 8, 1980

[51] Int. Cl.³ .............................................. B60J 9/04
[52] U.S. Cl. ..................................................... 296/1 S
[58] Field of Search ..................... 296/1 S; 180/89.14, 180/89.15, 89.16

[56] References Cited

U.S. PATENT DOCUMENTS

| | | | |
|---|---|---|---|
| 3,947,065 | 3/1976 | Geiger | 296/1 S |
| 4,018,472 | 4/1977 | Mason | 296/1 S |
| 4,141,580 | 2/1979 | Ivan | 296/1 S |
| 4,214,786 | 7/1980 | Morrison | 296/1 S |

*Primary Examiner*—Robert R. Song
*Attorney, Agent, or Firm*—Richard P. Matthews

[57] ABSTRACT

A wind deflector system for flat-nosed vehicles (C.O.E.—cabin over engine) composed of two complementary stages. The first stage consists of a flat upwardly-extending wedge-shaped cone which extends from the front of the flat-nosed vehicle and which deflects air around the cabin while the air flow applied to the front is diverted upwardly to the top of the cabin. At this point the second stage of the system, which lies on top of the cabin, comes into effect. The second stage, which is affixed to the roof of the cabin, enables the diverted wind from below to pass around and over the following trailer while a movable wing extension at the rear enables the driver to direct the course of the following wind.

9 Claims, 6 Drawing Figures

WIND DEFLECTOR SYSTEM FOR AERODYNAMIC DRAG REDUCTION

This invention relates to a wind deflector system for flat-nosed vehicles and, more particularly, to such a system having two complementary stages.

The invention is designed to make flat front vehicles (cabin over engine—C.O.E.) more aerodynamically streamlined to cut wind resistance both at the cabin front and for the following trailer. In turn, the reduction of air or wind resistance results in greater gas efficiency for the vehicle itself.

C.O.E. vehicles are usually designed with flat fronts which, when viewed aerodynamically, are in effect, nothing more than a 10'×8' wall moving down the road, thereby extending great amounts of pressure on the front with an extremely poor aerodynamic characteristic. While it has been known to use deflectors on top of the cabin for the following trailer, these deflectors do not eliminate the poor design of the cabin itself. With this invention it is possible for a trucker to take a poorly designed cabin and attach a system to make it aerodynamically superior to any cabin that exists today.

In accordance with the present invention, a nose cone, constituting a first air or wind deflector stage, is attached to the front of the flat portion of the cabin just under the windshield. This cone in side elevation approximates a right triangle and it is placed over the air vent and headlights. The cone is affixed to the truck by means of a hinge device that is suitably bolted to the front of the cabin. The reason for the hinge is to allow the cone to be raised vertically to enable the truck cabin to be tilted forward to permit inspection of and working on the engine. With the assistance of telescoping rods, the cone will stay in any desired position for any given angle of tilt for the cabin.

One problem encountered with the use of a nose cone which extends over the air intake to the cabin, is that it prevents air from cooling the radiator of the vehicle. However, a shutter system has been devised which provides a better cooling system than before the nose cone was installed. The vent system is manually operated to allow any amount of air into the cooling system that is desired. During cold weather operation, these vents can be closed completely to prevent cold air from coming into the radiator which would in turn heat up the engine and increase its horsepower. Conversely, during the warmer months of operation, the vents can be opened to allow maximum cooling of the radiator system.

With respect to the headlights, the cone is preferably equipped with attachments to move the headlights from the existing cabin to be received in the cone itself. This construction permits the lights to be moved forwardly and closer to the road surface for better visibility. Wire extension cables with proper connection fittings may be used to permit the use of existing master connections of the cabin to the nose cone. This part of the system helps to reduce the large area of static pressure against the front face of the tractor and allows the air flow to pass around and over the cabin.

The second stage of the system is a wedged arrow configuration that fits onto the top of the cabin to reduce additional drag by diverting the wind over and around the following trailer. There is also a very strong downflow normally present between the tractor and the trailer which customarily acts as a high resistance area on the front wall of the trailer and the portion that extends in greater height than the cabin. With the top deflector and wing extension which forms a part of the second stage of the wind deflector system of the present invention, this high pressure area will be practically eliminated in the improved wind deflector system of this invention.

The inherent advantages and improvements of the present invention will become more readily apparent upon reference to the following detailed description of the invention and by reference to the drawings in which.

Figure 1:
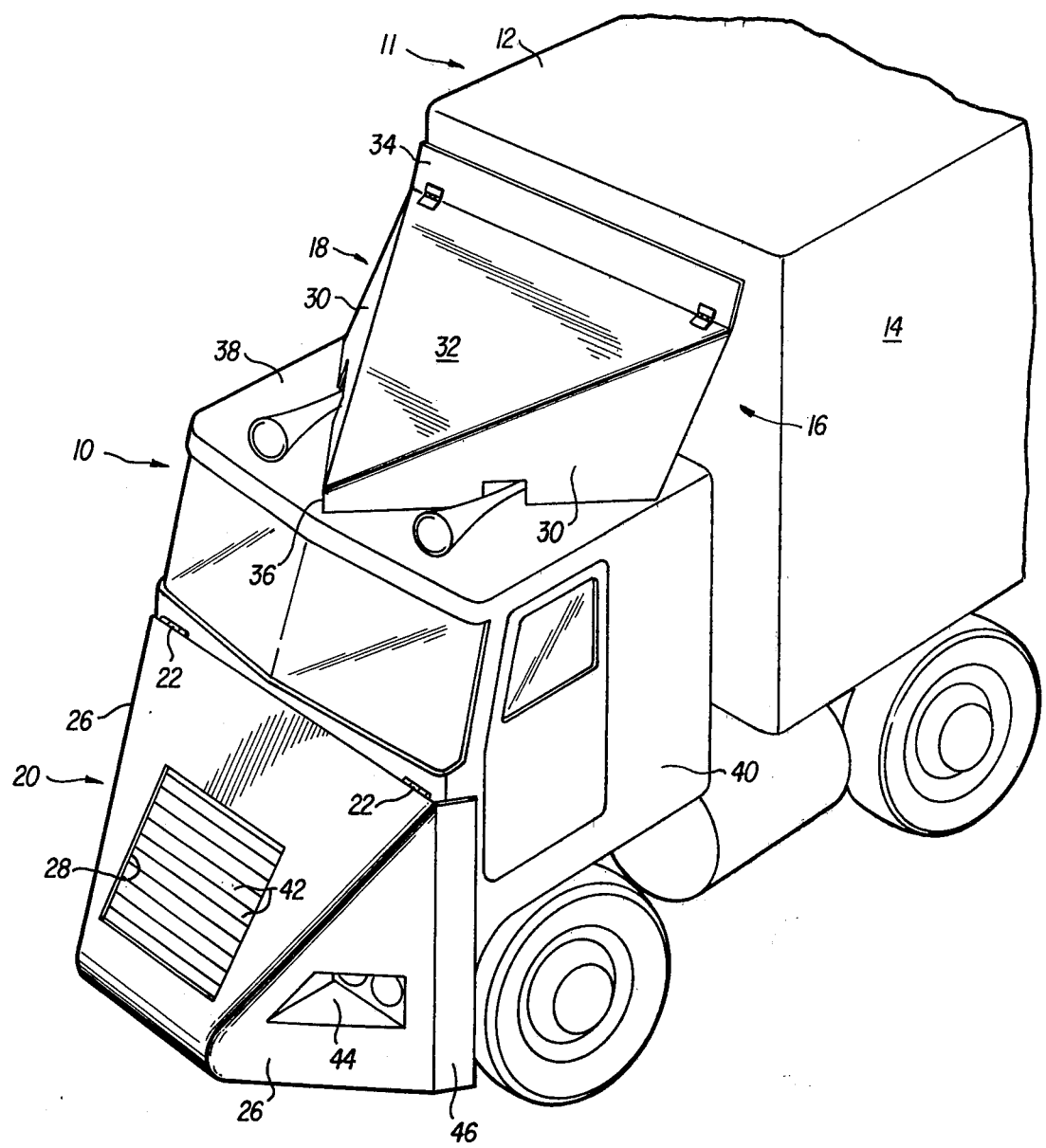
FIG. 1 is a perspective view of a cabin over engine vehicle with both stages of the aerodynamic drag reduction system of the present invention attached.

Referring now to FIG. 1, a conventional tractor-trailer vehicle is illustrated which includes a tractor indicated generally at 10 and a trailer 11. Tractor 10 is a cabin over engine sleeper but the same system is applicable to non-sleeper cabin over engine vehicles. A portion of the top 12 and sidewall 14 of the trailer 11 is illustrated in FIG. 1. A space or gap between the tractor 10 and trailer 11 is indicated generally at 16.

Figure 2:
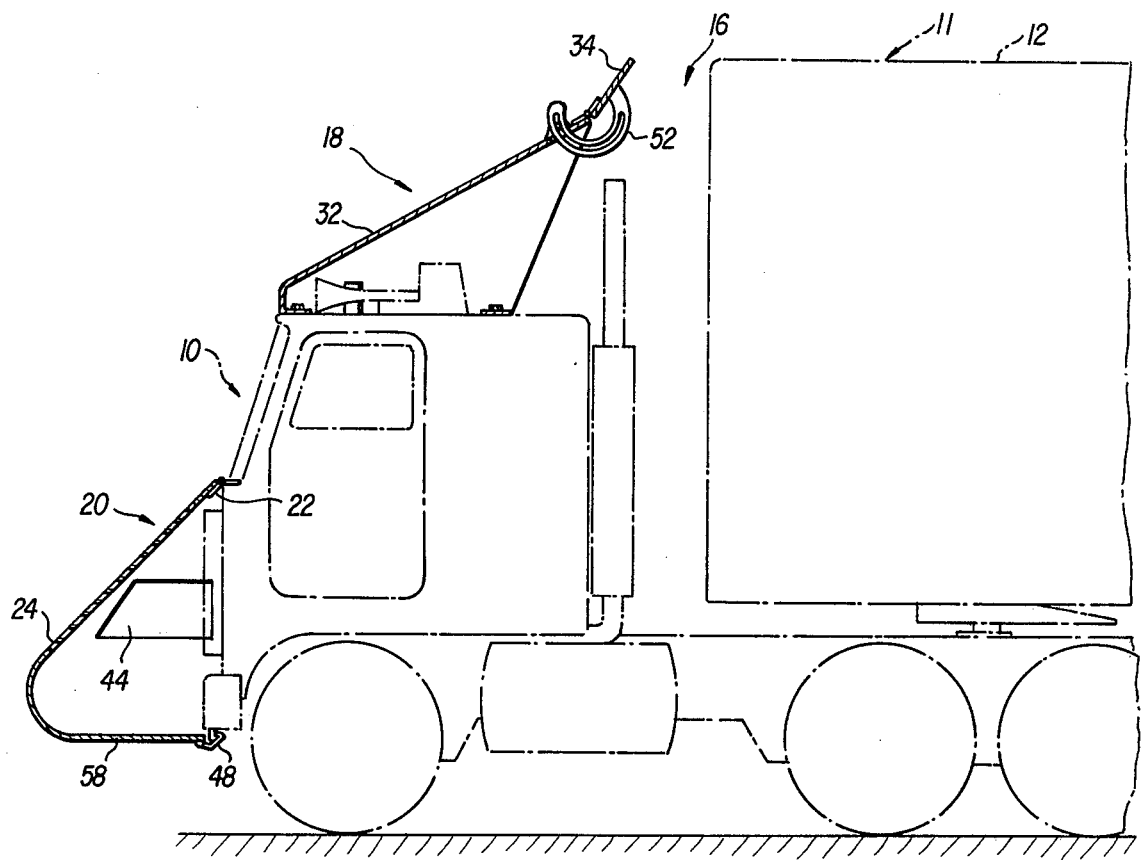
FIG. 2 is a side elevational view of the system shown in FIG. 1.
Figure 4:
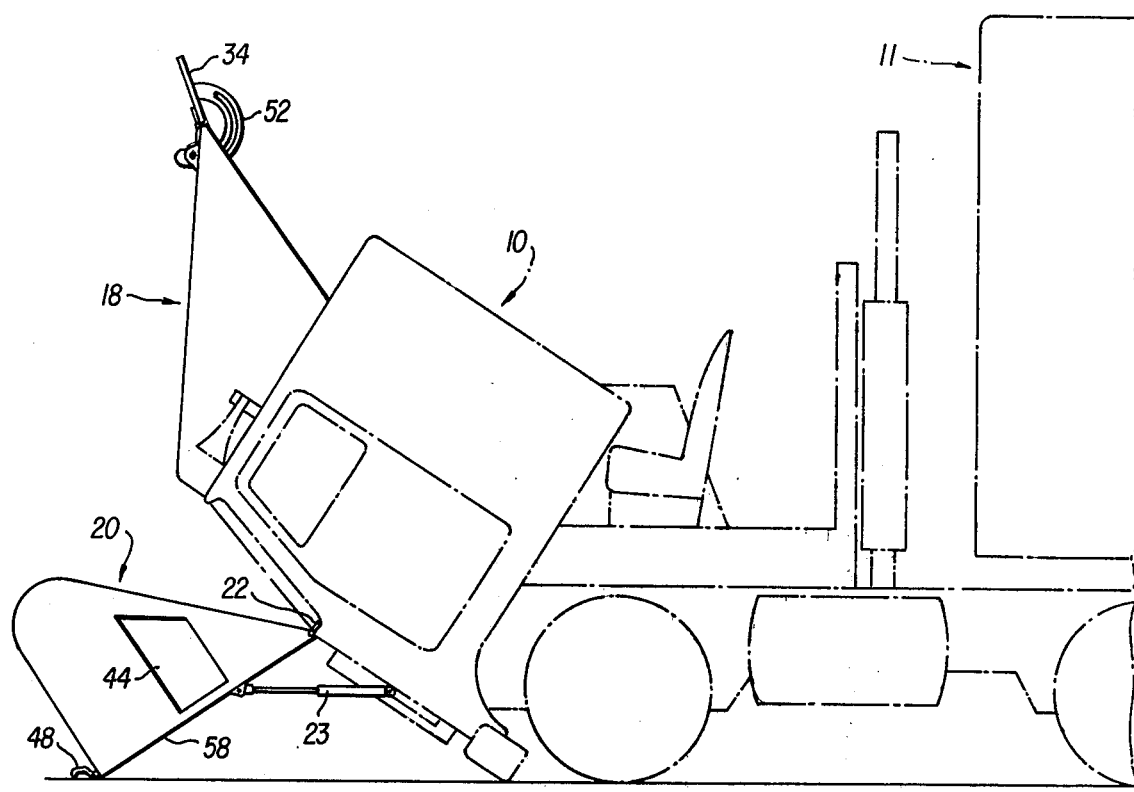
FIG. 4 is a side elevational view showing the movement and operation of the nose deflector stage when the cabin is tilted forwardly to expose the engine.
Figure 5:
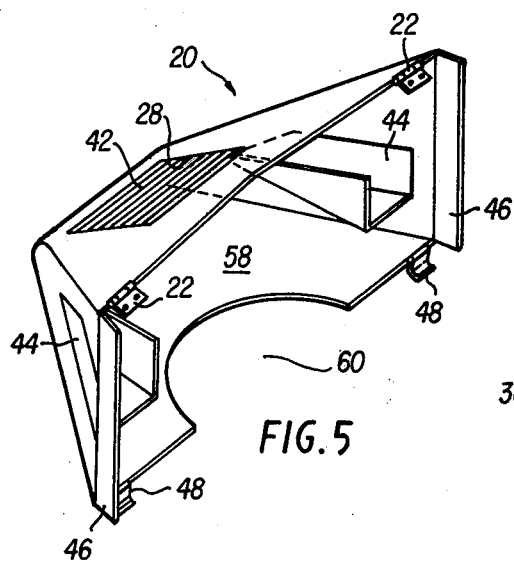
FIG. 5 is a perspective view of the first stage of the wind deflector system.

A first wind or air deflector stage is indicated generally at 20, attached to the nose portion and a second wind or air deflector stage is indicated at 18 for the top of the cabin 40 of tractor 10. In particular, the first wind deflector stage 20 is affixed to the front of the cabin 40 by means of a hinge and pin arrangement 22 illustrated in FIG. 1 and bottom clamping means 48 as seen in FIG. 2. The hinge and pin arrangement 22 allows the wedge or cone-shaped first deflector stage 20 to be raised as is illustrated in FIG. 4. Bracing means in the form of telescoping rods 23 may also be used to hold the cone-shaped first deflector stage 20 upright when tilting the cabin 10 forwardly to gain access to or to permit working on the engine.

The wedge or cone-shaped first deflector stage 20 when attached covers both the air vents and headlights of tractor 10. However, the first wind or air deflector stage 20 is preferably equipped with an opening 28 which has air vent type blades 42 which may be manually opened or closed as desired by the driver. To accommodate the use of headlights, the cone-shaped first deflector stage 20 has openings 44 and a recessed mounting within which direct relocation and mounting of existing headlights from the main cabin may be achieved. This construction gives total and unrestricted use of headlights in the same manner of operation as before. The cone-shaped first wind deflector stage 20 has three wind deflecting surfaces. The first is a centrally located surface 24 which directs the air or wind up the cone 20 to the top deflector 18. The second and third surfaces consist of a pair of side deflecting surfaces 26 for deflecting the wind directly around the sides of the cabin with the aid of a flared side deflector 46.

The cone-shaped first wind deflector stage 20 has a bottom surface 58 which in normal traveling position is generally parallel to the road surface. Bottom surface 58 has a portion 60 cut out therefrom so that air or wind which passes through the slots provided by the positioning of air vent blades 42 passes downwardly beneath the cabin.

Figure 6:
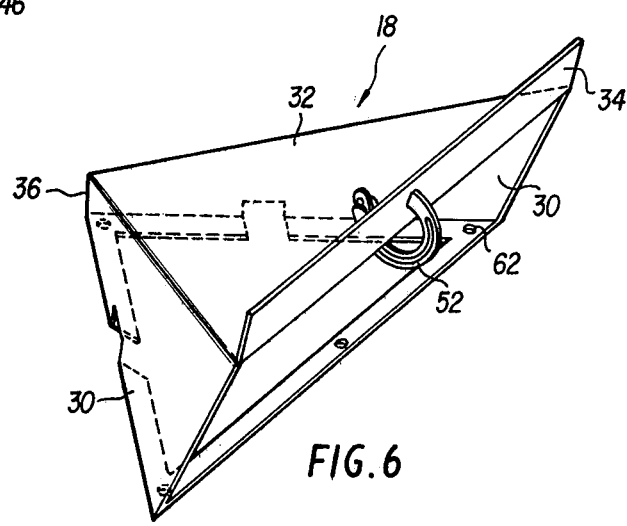
FIG. 6 is a perspective view of the second stage of the wind deflector system.

The second stage of the deflector system is a wedge-shaped deflector 18 affixed to the roof 38 of the cabin by means of bolts through bolt openings 62 shown in FIG. 6. The top deflector or second stage 18 is generally an arrow-shaped wedge having a first centrally located surface 32 for deflecting wind over the top of the trailer which follows the vehicle with the aid of an adjustably positioned back wing 34. The second wind deflector stage 18 also has a leading edge 36 which receives the wind from below and splits it so that top surface edge 32 directs the air flow backwardly toward the rear where the back wing 34 will pass the wind upwardly and over the top 12 of the trailer 11. The opposed side walls 30 carry the remainder of the wind around the side wall 14 of trailer 11.

Figure 3:
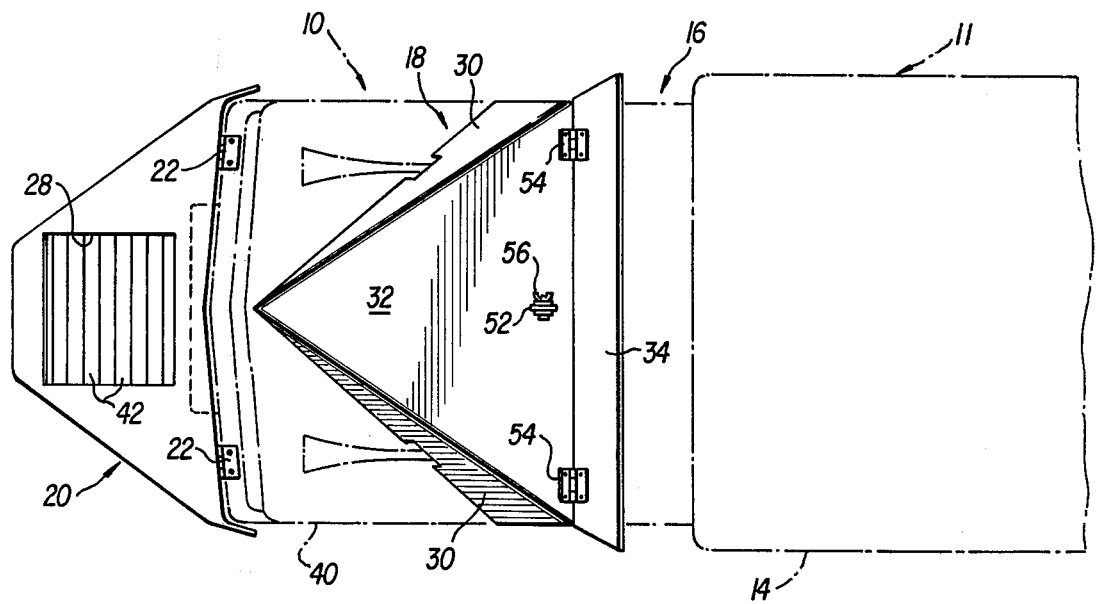
FIG. 3 is a top plan view of the system shown in FIG. 1.

In FIG. 2 the wing 34 is shown attached to the trailing edge of the main deflector 32 by means of hinges 54, FIG. 3. The wing 34 is adjustably positionable by means of a slotted bracket 52 attached to wing 34 and slidable through an aperture in surface 32 and held in place by suitable bolt and nut means, such as wing nuts 56.

While a presently preferred embodiment of the invention has been illustrated and described, it will be recognized that the invention may be otherwise variously embodied and practiced within the scope of the claims which follow.

What is claimed is:

1. A wind deflector system for a flat-nosed vehicle of the type having a cabin over the engine which comprises
   a. a first wind deflector stage attachable to the front of the vehicle,
      1. said first wind deflector stage being generally wedge-shaped in side elevation with a first, centrally located surface for deflecting wind upwardly toward the top of the cabin,
      2. said first wind deflector stage having a pair of side deflecting surfaces for deflecting the wind around the sides of the cabin,
      3. said first wind deflector stage being pivotally attached to said vehicle adjacent the top of said first, centrally located wind deflecting surface and releasably connected to said vehicle adjacent the bottom of said wedge-shaped deflector whereby said first wind deflector stage may be pivotally advanced with respect to the front of said vehicle so as not to restrict the full forward tilting of said cabin when it is desired to gain access to the engine of said vehicle,
   b. a second wind deflector stage mounted atop the cabin,
      1. said second wind deflector stage having first surface means for deflecting wind over the top of a trailer following said vehicle,
      2. and second surface means for deflecting wind around the sides of said trailer.

2. A wind deflector system as defined in claim 2 wherein said first wind deflector stage is provided with suitable apertures to permit advancing the headlights of the vehicle forwardly from the front of the cabin.

3. A wind deflector system as defined in claim 2 including means for mounting said headlights in said first wind deflector stage.

4. A wind deflector system for a flat-nosed vehicle of the type having a cabin over the engine which comprises
   a. a first wind deflector stage attachable to the front of the vehicle,
      1. said first wind deflector stage being generally wedge-shaped in side elevation with a first, centrally located surface for deflecting wind upwardly toward the top of the cabin,
         i. said first, centrally located wind deflecting surface being provided with aperture means and said generally wedge-shaped first wind deflector stage having a bottom surface generally parallel to the road surface with a portion of said bottom being cut out to permit wind which enters through said aperture means to be directed beneath said cabin,
      2. said first wind deflector stage having a pair of side deflecting surfaces for deflecting the wind around the sides of the cabin,
   b. a second wind deflector stage mounted atop the cabin,
      1. said second wind deflector stage having first surface means for deflecting wind over the top of a trailer following said vehicle,
      2. and second surface means for deflecting wind around the sides of said trailer.

5. A wind deflector system as defined in claim 4 wherein said first wind deflector stage is pivotally attached to said vehicle adjacent the top of said first, centrally located wind deflecting surface and releasably connected to said vehicle adjacent the bottom of said wedge-shaped deflector whereby said first wind deflector stage may be pivotally advanced with respect to the front of said vehicle so as not to restrict the full forward tilting of said cabin when it is desired to gain access to the engine of said vehicle.

6. A wind deflector system for a flat-nosed vehicle of the type having a cabin over the engine which comprises
   a. a first wind deflector stage attachable to the front of the vehicle,
      1. said first wind deflector stage being generally wedge-shaped in side elevation with a first, centrally located surface for deflecting wind upwardly toward the top of the cabin,
      2. said first wind deflector stage having a pair of side deflecting surfaces for deflecting the wind around the sides of the cabin,
   b. a second wind deflector stage mounted atop the cabin,
      i. said second wind deflector stage having first surface means for deflecting wind over the top of a trailer following said vehicle,
      ii. said second wind deflector stage having second surface means for deflecting wind around the sides of said trailer,
      iii. said second wind deflector stage being generally wedge-shaped in side elevation and said means for deflecting wind over the top of the trailer includes a first, centrally located surface on said wedge-shaped wind deflector stage,
         1. and said first, centrally located surface on said second wind deflector stage being followed by a trailing edge surface whose position is adjustable with respect to said first, centrally located surface.

7. A wind deflector system as defined in claim 6 including means to lock said trailing edge surface in place with respect to said centrally located surface on said second wind deflector stage.

8. A wind deflector system as defined in claim 6 wherein said wedge-shaped second wind deflector stage further includes a pair of side skirt portions for deflecting wind outwardly around the sides of said trailer.

9. A wind deflector system as defined in claim 6 wherein said first, centrally located surface on said second wind deflector stage is generally triangularly shaped and said adjustable trailing edge surface lies along one side of the triangularly shaped centrally located surface and is generally rectangular in shape.

* * * * *